Oct. 21, 1958

R. N. WINFREE ET AL 2,856,892

PAN GREASING MACHINE

Filed March 27, 1956

5 Sheets-Sheet 1

INVENTORS
Robert N. Winfree +
Henry Clay Reed

BY Young, Emery & Thompson

ATTORNEYS

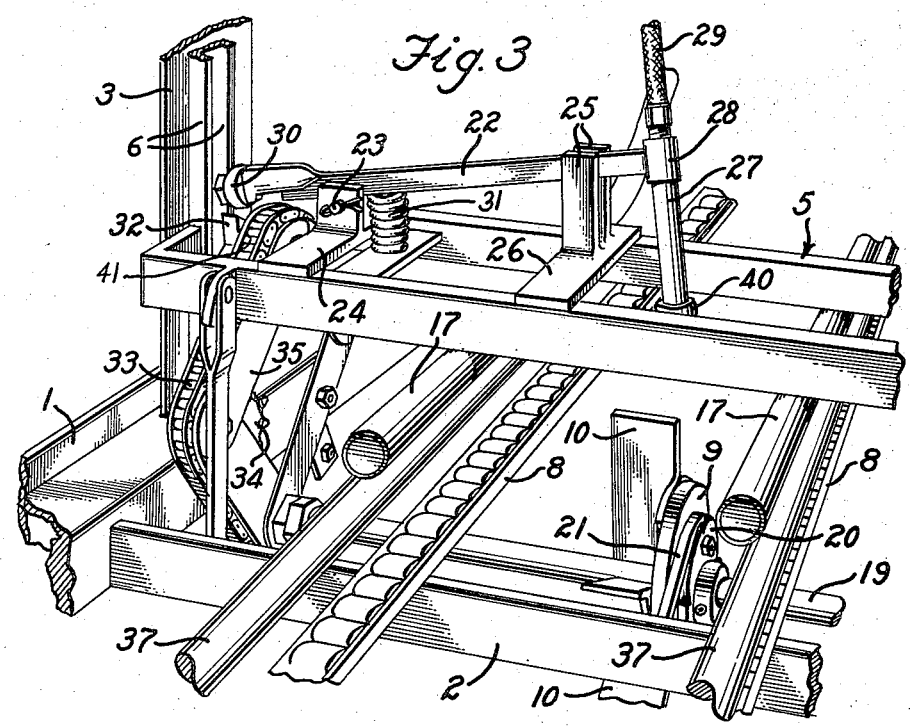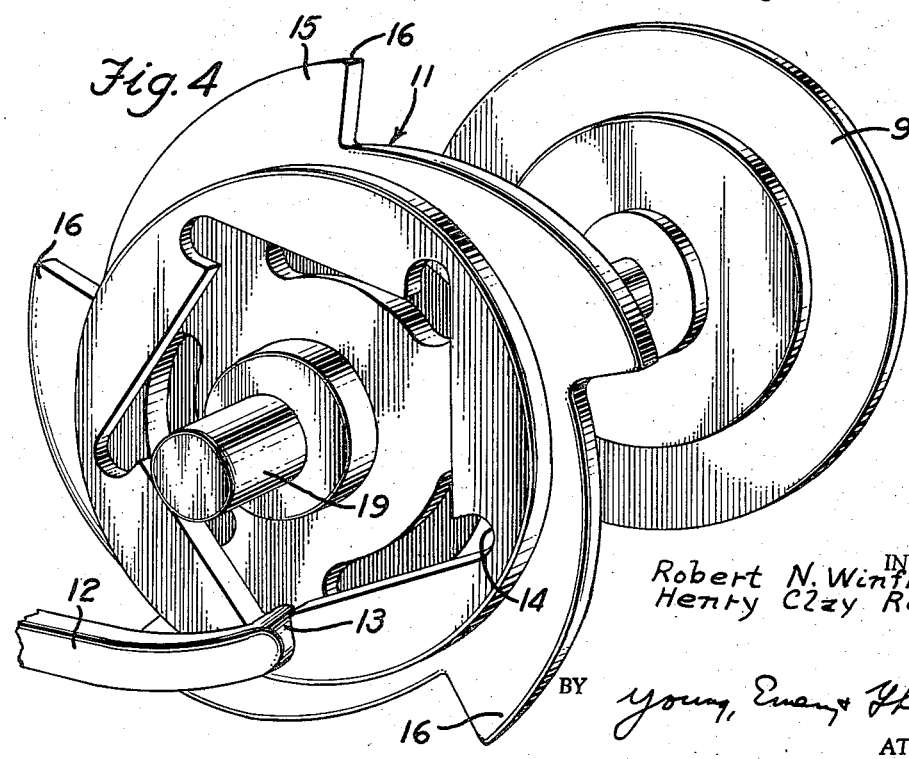

Oct. 21, 1958  R. N. WINFREE ET AL  2,856,892
PAN GREASING MACHINE
Filed March 27, 1956  5 Sheets—Sheet 4
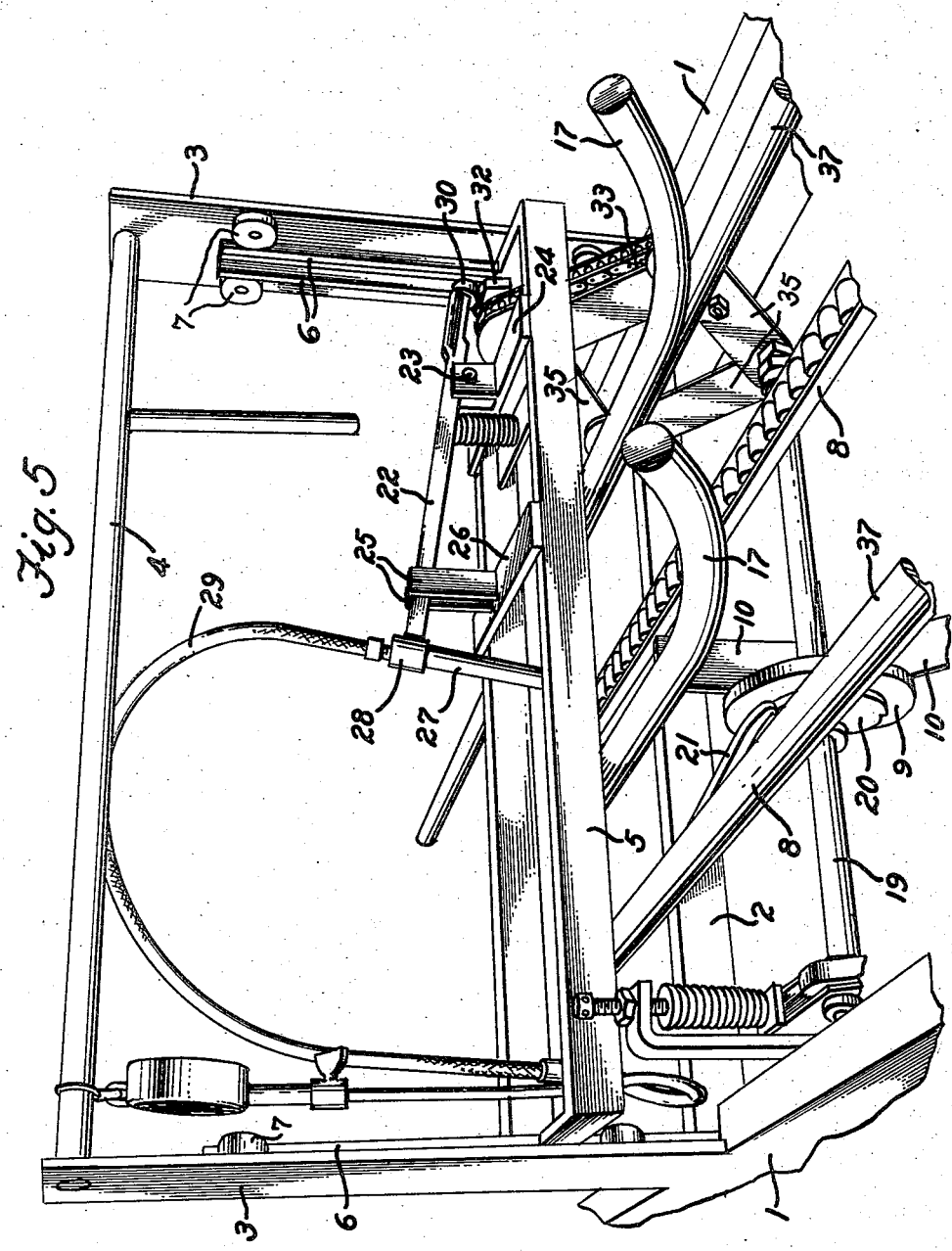
INVENTORS
Robert N. Winfree +
Henry Clay Reed
BY *Young, Emery + Thompson*
ATTORNEYS

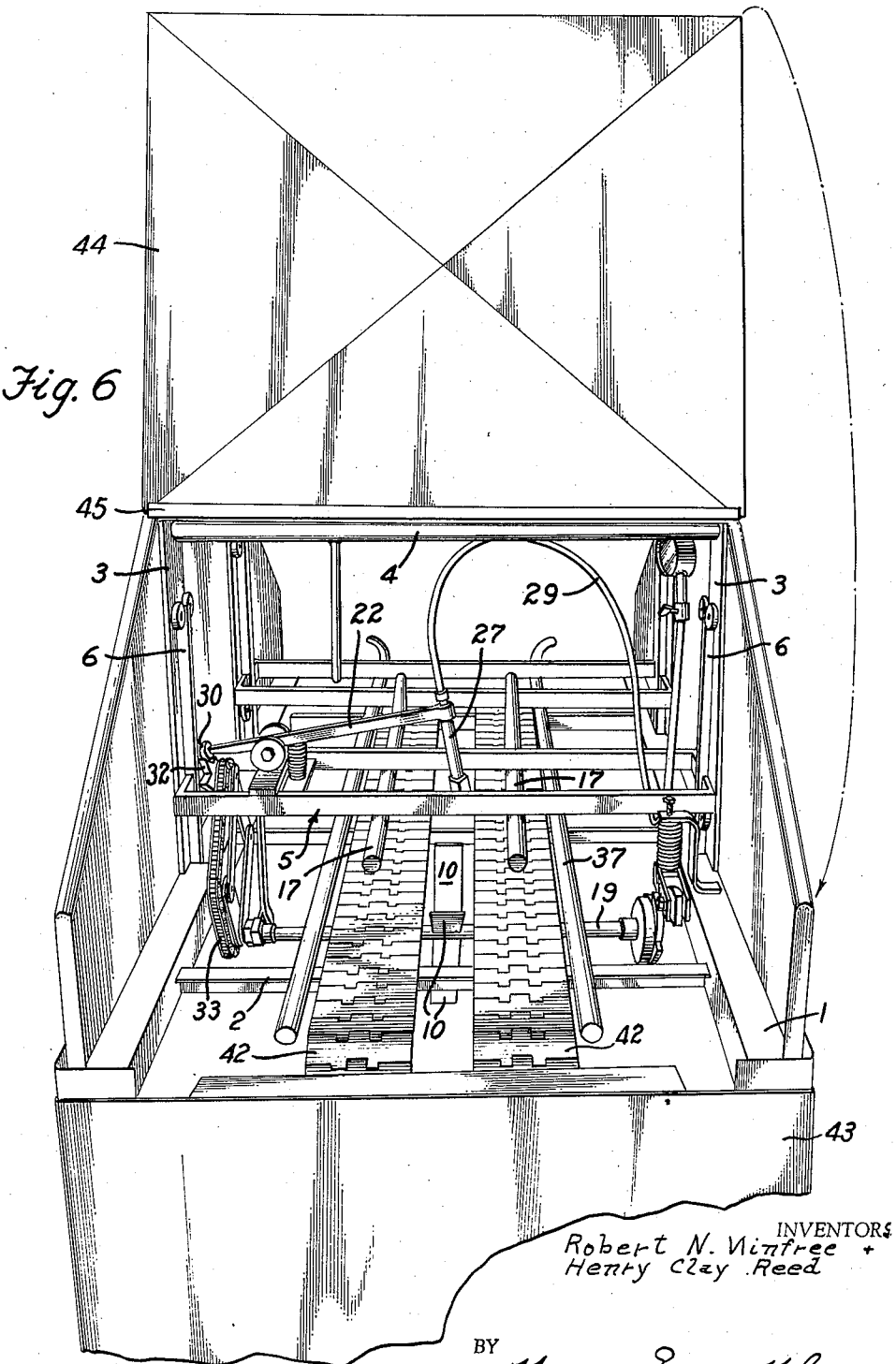

United States Patent Office
2,856,892
Patented Oct. 21, 1958

2,856,892

PAN GREASING MACHINE

Robert Nelson Winfree and Henry Clay Reed, Lynchburg, Va.

Application March 27, 1956, Serial No. 574,166

2 Claims. (Cl. 118—8)

This invention relates to a machine for applying an oil or grease coating to the interior of pans, particularly to such pans which are used for baking bread and the like bakery products.

It is an object of the invention to provide a machine which will automatically apply a small quantity of oil on the inside surface of each pan with the coating means operated automatically by each pan as activated by its forward motion on a moving conveying means or chains. Another object of the invention resides in the provision of means for driving the conveyor chains and they in turn move the pans so that as each pan passes under an oil applying nozzle, the latter will be momentarily lowered into the inside of each pan at the same time that a valve is actuated to release a small quantity of oil from the nozzle into each pan.

Another object of the invention is to provide a nozzle structure for the release of the oil so that the oil is compressed in a cylinder driven by a piston in a stroke of the piston which in turn forces the nozzle valve to open for ejecting oil into each pan.

A still further object of the invention resides in the provision of a machine for greasing pans using table top chains driven by suitable means and such driven pans activate a paddle wheel which in turn activates both a movable nozzle and also a booster pump through a cam or ratchet.

A further object of the invention resides in the provision of a ratchet disc and lever to allow the backward movement of the pans through the machine.

Figure 1:
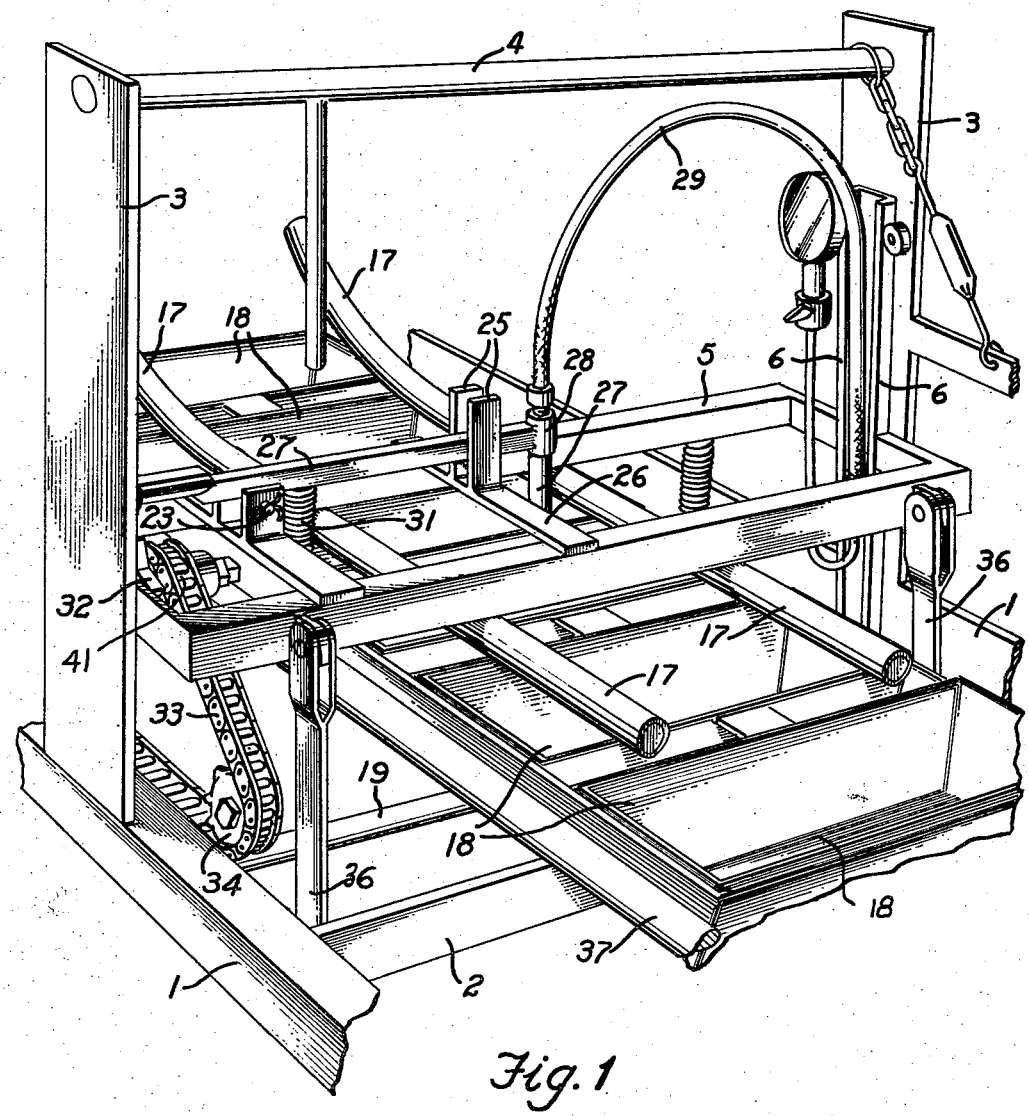
Figure 2:
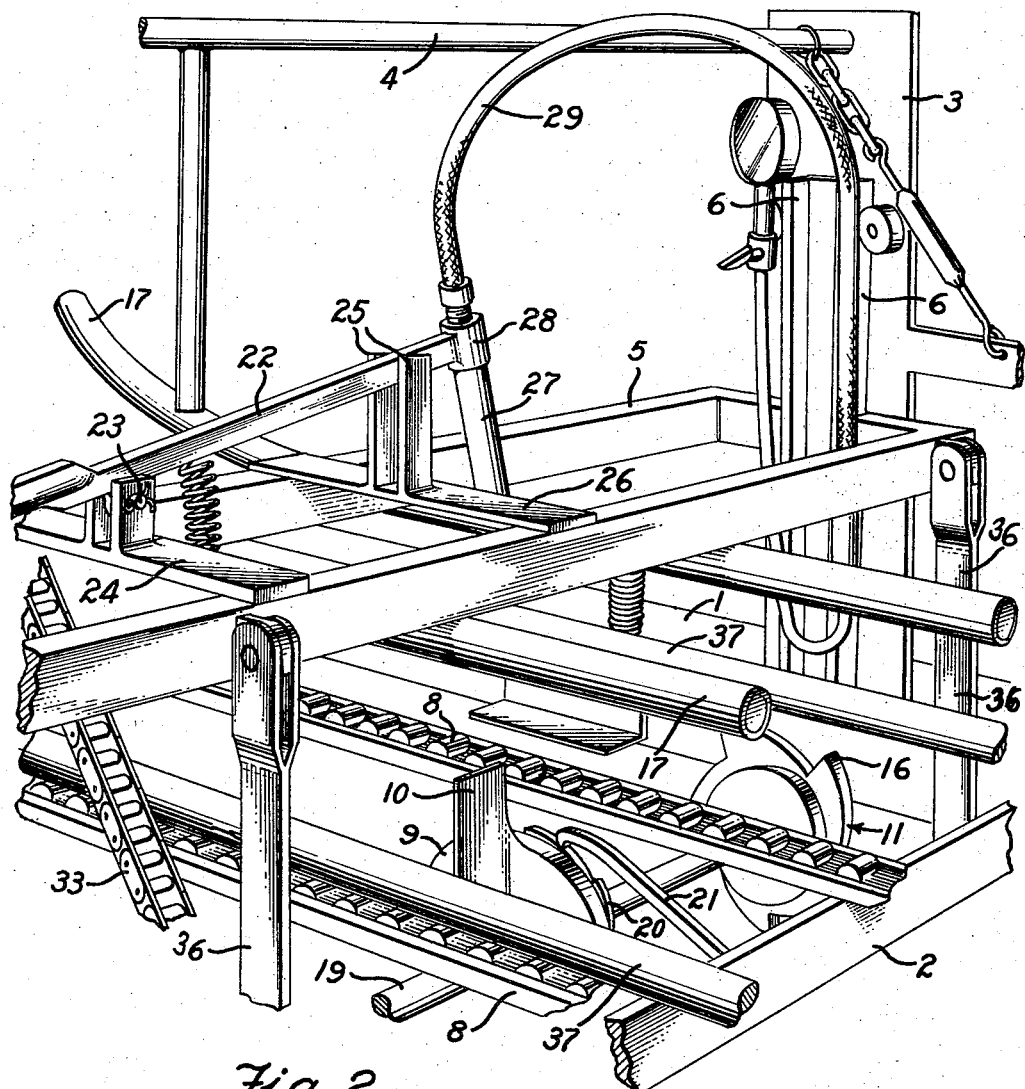

Further objects will be apparent from the following description when considered in connection with the accompanying drawings in which:

Figure 1 is a perspective view of the machine with the pans therein,

Fig. 2 is a perspective view of a part of the machine showing the means movable by the pans to actuate the grease applying means, Fig. 3 is a perspective view showing the details of the nozzle lever arm, Fig. 4 is a perspective view of a detail of the drive from the pans and the cam means for operating the pump, Fig. 5 is a perspective view showing the upper carriage of the machine and the pan guides, and Fig. 6 is an end elevation of a modified pan greasing machine.

The machine is provided with suitable longitudinal frame members 1 interconnected by cross members 2 and upright members or posts 3. The two upright members 3 are interconnected by a tubular strut 4 as shown in Figs. 1 and 2. A secondary frame 5 is adjustably supported on the upright members 3 and this frame 5 is of substantially rectangular shape and is horizontally arranged. A plurality of lever arms 36 are connected to the frame 5 to adjust the latter as to height as will be explained. As shown in Fig. 5 the frame 5 is provided with guide bars 6 which may be interconnected by a web portion and which are adapted to slide on the inner side of each upright post 3, and to maintain the parts in position a plurality of guide rollers 7 are mounted on the upright members 3.

As best shown in Fig. 5, the pans to be greased travel on roller chains in guideways 8 and the pans pass continuously under the secondary frame unit 5. In order to intermittently actuate the grease applying means there is provided a wheel 9 in the form of a paddle wheel having a plurality of blades 10 whereby each blade will contact one of a group of pans or pan units one pan at a time. The paddle drive wheel 9 is mounted to rotate with a shaft 19 on which a cam device 11 is also mounted as shown in detail in Fig. 4 in which a reciprocating rod 12 is suitably driven and is provided with a laterally extending arm or knob 13 which engages in the notches 14 one by one with the movement of the cam disc 15 movable counterclockwise. The cam disc 15 is provided with a plurality of extending cam surfaces 16 which are adapted to intermittently contact a piston of a pump to open the supply of oil under pressure to be fed to the nozzle which latter has a valve therein which opens under pressure.

As best shown in Figs. 1 and 5 a pair of guide arms 17 are secured to the underside of the frame 5 and preferably there are two in number. The arms 17 are for the purpose of guiding the pans during their passage under the oil spray nozzle. Fig. 1 shows for example the bread pans 18 passing under the guide arms 17.

The paddle wheel 9 and the cam device 11 are mounted on the shaft 19 which is suitably driven by the pans as the latter pass through the machine and to feed the oil into each pan. In order to allow a backward travel of the pans as when they are not removed from the machine as rapidly as possible there is provided a ratchet wheel 20 mounted on the shaft 19 and cooperating with an arm 21 which is secured on the frame of the machine, and which allows the backward movement of the pans by stopping the paddles in a position which allows the pans to pass over it.

As to the system for feeding and spraying oil in each pan there is provided a lever arm 22 pivotally mounted at 23 on a cross bar 24 of the secondary frame 5. The lever arm is guided near its outer end between two parallel uprights 25 mounted on a second cross bar 26 also mounted on the secondary frame 5. A nozzle element 27 is secured on the end 28 and a flexible hose connection 29 leads to the pump, which latter is intermittently actuated by means of the cam device 11 each time a cam surface 16 actuates the pump to place the oil under pressure to be released by escape from the nozzle 27 through a spring pressed check valve in the nozzle end 40. Figs. 3 and 5 show the inner end of the lever arm 22 provided with a roller 30 which latter cooperates with a cam device 32. In order to provide for the raising of the nozzle 27 after each cam action from cam 32 there is provided a spring 31 which, as shown, constantly urges the arm 22 to rotate counterclockwise relative to Fig. 3.

The machine is driven by any suitable electric motor not shown and such motor may be connected to drive the guideways 8 which latter move the pans and in turn the paddle drive wheel 9 and 10 and also a suitable gear on the one end of the shaft 19 to drive a chain 33 cooperating with a plurality of sprocket wheels 34 of which the upper sprocket wheel 41 is connected to actuate the cam device 32.

In order to adjust the height of the secondary frame 5 the latter is supported by means of a plurality of levers 35 interconnected in parallelogram fashion so that if larger or smaller pans are to be treated the frame 5 is raised or lowered guided by the bars 6 secured to the frame 5 sliding adjacent the uprights 3 and held in place by means of the rollers 7. The raising and lowering of the frame 5 is suitably carried out by means of the lever arms 36. In order to guide the pans on the tracks 8 a pair of side rails 37 are provided against which the pans may slide in their travel through the machine.

The machine of Figs. 1 to 5 operates as follows:

The pans 18 to be each sprayed with a very thin layer of grease or oil may be fed into and through the machine by any suitable means such as permitting the pans to travel by gravity onto the roller guide tracks 8 guided by the side rails 37 and the top rails 17. The bladed wheel 9, by means of the paddles 10, is moved by the pans along the tracks 8 and when each pan arrives under the nozzle 27 the cam 32 will momentarily move the nozzle downwardly until the nozzle end where the check valve 40 is provided dips below the upper rim of the pan. At that instance one of the cam surfaces 16 has moved the piston plunger of the oil pump to the required pressure to overcome the spring force in the check valve 40 resulting in a thin film of oil to be directed into the interior surface of each pan. Thereafter the lever arm 22 is forced upwardly by spring pressure from the spring 31 until the next pan moves over and under the nozzle 27. It is of course possible to use individual pans in the machine or pans which are strapped together into groups as for example four in number.

The machine of Fig. 6 is similar to the machine of Figs. 1 to 5 except that in Fig. 6 the pans are fed through the machine on and by means of a pair of table top chains 42. The mechanism is enclosed in a stainless steel casing 43 with a top lid 44 hinged at 45 for ready access to the interior parts of the machine. The machine of Fig. 6 operates in a manner similar to Figs. 1 to 5 in that the pans activate the paddle wheel which in turn activates both the nozzle in its up and down reciprocating motion into and out of the pans and also the booster pump or the cam or ratchet which activates the booster pump.

We claim as our invention:

1. Pan greasing apparatus comprising a frame including a pair of upright members, guideways supported by the frame on which the pans travel, a secondary frame adjustably mounted on the upright members, a pair of side rails supported by the first-mentioned frame to guide the pans and prevent lateral shifting of the pans on the guideways, a pair of guide arms secured on the underside of the secondary frame to keep the pans from moving vertically off of the guideways, a lever arm pivotally mounted on the secondary frame between the ends of the lever arm and having a nozzle element secured at one end thereof, means operative on the other end of the lever arm to positively move the nozzle element mechanically around the pivotal mounting into and out of each pan as the latter travels on the guideways restrained by the pairs of rails and guide arms, and means connected to the nozzle to feed grease under pressure to the nozzle.

2. Pan greasing apparatus according to claim 1, in which means are provided operable by the pans to intermittently actuate the lever arm through the first-mentioned means.

References Cited in the file of this patent

UNITED STATES PATENTS

| | | |
|---|---|---|
| 1,440,624 | Peters | Jan. 2, 1923 |
| 1,917,767 | Larson | July 11, 1933 |
| 2,499,621 | Archer | Mar. 7, 1950 |
| 2,557,479 | Smith | June 19, 1951 |
| 2,654,911 | Sharlip | Oct. 13, 1953 |
| 2,747,539 | Peffer | May 29, 1956 |